US012688193B2

(12) United States Patent
Cashion et al.

(10) Patent No.: US 12,688,193 B2
(45) Date of Patent: *Jul. 21, 2026

(54) MACHINE LEARNING ENABLED REAL TIME QUERY HANDLING SYSTEM AND METHOD

(71) Applicant: The Toronto-Dominion Bank, Toronto (CA)

(72) Inventors: Daniel B. Cashion, New York, NY (US); Mikhail Dron, Ardsley, NY (US); Kumar Bhargava, Jersey City, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/985,588

(22) Filed: Dec. 18, 2024

(65) Prior Publication Data

US 2025/0124039 A1      Apr. 17, 2025

Related U.S. Application Data

(63) Continuation of application No. 17/557,632, filed on Dec. 21, 2021, now Pat. No. 12,210,534.

(51) Int. Cl.
| | |
|---|---|
| *G06F 16/2457* | (2019.01) |
| *G06F 16/2452* | (2019.01) |
| *G06F 40/284* | (2020.01) |

(52) U.S. Cl.
CPC .. *G06F 16/24578* (2019.01); *G06F 16/24522* (2019.01); *G06F 40/284* (2020.01)

(58) Field of Classification Search
CPC ......... G06F 16/24578; G06F 16/24522; G06F 40/284; G06F 40/194; G06F 40/242; G06F 40/30; G06F 40/216
See application file for complete search history.

(56) References Cited

U.S. PATENT DOCUMENTS

| | | | |
|---|---|---|---|
| 10,379,995 B1 * | 8/2019 | Walters | G06F 21/6245 |
| 2010/0125559 A1 * | 5/2010 | Hadjieleftheriou | |
| | | | G06F 16/24545 |
| | | | 707/706 |

(Continued)

FOREIGN PATENT DOCUMENTS

| | | |
|---|---|---|
| CA | 3065911 | 12/2018 |

OTHER PUBLICATIONS

USPTO; Office Action relating to U.S. Appl. No. 17/557,632 dated Jul. 2, 2024.

(Continued)

*Primary Examiner* — Apu M Mofiz
*Assistant Examiner* — Oscar Wehovz
(74) *Attorney, Agent, or Firm* — Rowand LLP

(57) ABSTRACT

A computer-implemented method may include: performing word tokenization on identifiers in a first identifier set to obtain a first set of tokens; performing word tokenization on identifiers in a second identifier set to obtain a second set of tokens; obtaining a weighting value for each of a plurality of tokens in the first set of tokens and the second set of tokens based on a frequency of occurrence; for each identifier of a plurality of identifiers in the first identifier set and of a plurality of identifiers in the second identifier set, obtaining embeddings for the identifier based on the embeddings of tokens obtained by performing word tokenization on that identifier and based on the weighting value for such tokens; obtaining similarity metrics. The similarity metrics may be used for rapid query handling to generate user interface screens in real time. Obtaining weighting values may use machine learning.

20 Claims, 8 Drawing Sheets

(56) References Cited

U.S. PATENT DOCUMENTS

| 2012/0323825 A1* | 12/2012 | Chen | G06F 16/35 |
| | | | 706/12 |
| 2018/0074786 A1* | 3/2018 | Oberbreckling | G06F 16/2255 |
| 2019/0332705 A1* | 10/2019 | Bordawekar | G06N 20/00 |
| 2020/0167525 A1* | 5/2020 | Wolniewicz | G06F 40/216 |
| 2021/0042800 A1* | 2/2021 | Chandra | H04L 51/02 |
| 2022/0171800 A1* | 6/2022 | Kumaresan | G06F 11/321 |
| 2022/0179892 A1* | 6/2022 | Kermode | G06N 3/08 |

OTHER PUBLICATIONS

USPTO; Office Action relating to U.S. Appl. No. 17/557,632 dated Mar. 20, 2024.
USPTO; Office Action relating to U.S. Appl. No. 17/557,632 dated Dec. 23, 2022.
USPTO; Office Action relating to U.S. Appl. No. 17/557,632 dated May 22, 2023.
USPTO; Advisory Action relating to U.S. Appl. No. 17/557,632 dated Aug. 4, 2023.
USPTO; Office Action relating to U.S. Appl. No. 17/557,632 dated Sep. 14, 2023.
USPTO; Advisory Action relating to U.S. Appl. No. 17/557,632 dated Jun. 5, 2024.
CA Office Action dated Jan. 30, 2026; CA Application No. 3,145,124.

* cited by examiner

100

Word Tokenizer
402

Weighting Engine
404

Encoder
406

Evaluation Engine
408

User Interface Generation Engine
410

110

500

600

610

Obtain dictionary of tokens

620

Determine Frequency

630

Perform Grid Search

640

Obtaining weighting value using exponentially decaying weighting function

700

800

MACHINE LEARNING ENABLED REAL TIME QUERY HANDLING SYSTEM AND METHOD

TECHNICAL FIELD

The present application relates to data management systems and, more particularly, to systems and computer-implemented methods to enable rapid query handling and rapid data retrieval.

BACKGROUND

Data storage systems often store data in association with an identifier, key or index which may be used to rapidly retrieve data. Such techniques allow data to be retrieved based only on the identifier. By way of example, an identifier may be a name of an entity and the data that may be retrieved based on the entity name may be other information related to the entity, such as an address, contact information, etc.

Problems sometimes arise when different data sources use or maintain inconsistent identifiers, keys or indexes. There may be various causes of such inconsistencies. For example, typographical errors or differences in formatting preferences between data sources may cause inconsistencies. In some instances, it may be difficult to correct inconsistencies since data sources may be maintained on different computing systems.

Inconsistencies in identifiers may result in slow data retrieval or may result in inaccurate data retrieval, such as some data being omitted during retrieval. Further, user interfaces that are generated based on data sources that use inconsistent identifiers may be slow to load or may be incomplete.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
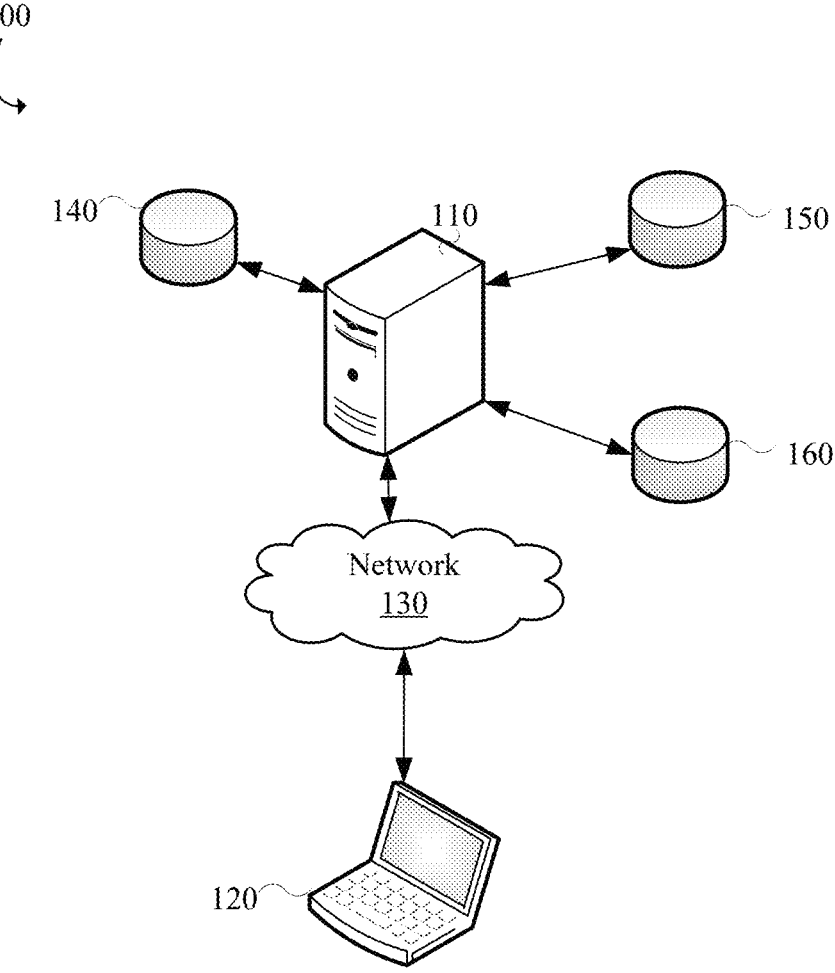
FIG. 1 is a schematic operation diagram illustrating an operating environment of an example embodiment.

According to an aspect there is provided a computer system. The computer system may include a processor and a communications module coupled to the processor. The computer system may include a memory module coupled to the processor and storing instructions that, when executed by the processor, cause the computer system to: perform word tokenization on identifiers in a first identifier set to obtain a first set of tokens; perform word tokenization on identifiers in a second identifier set to obtain a second set of tokens; obtain a weighting value for each of a plurality of tokens in the first set of tokens and the second set of tokens based on a frequency of occurrence; for each identifier of a plurality of identifiers in the first identifier set and of a plurality of identifiers in the second identifier set, obtain embeddings for the identifier based on embeddings of tokens obtained by performing word tokenization on that identifier and based on the weighting value for such tokens; obtain similarity metrics for identifiers in the first identifier set and identifiers in the second identifier set based on the embeddings for such identifiers; store a similarity profile based on the similarity metrics for identifiers in the first identifier set, the similarity profile including data mapping one or more identifiers in the first identifier set to one or more identifiers in the second identifier set; receive a query; and in real time in response to receiving the query, generate a user interface based on a selected similarity profile identified based on the query.

Conveniently, in this way, user interfaces may be generated in real-time or near real time even where data sources that are used to generate such user interfaces may not index data in a standard manner.

In some implementations, the instructions may further configure the computing device to: prior to performing word tokenization on the identifiers in the first identifier set, pre-processing the first identifier set to standardize the identifiers in the first identifier set; and prior to performing word tokenization on the identifiers in the second identifier set, pre-processing the second identifier set to standardize the identifiers in the second identifier set.

In some implementations, pre-processing to standardize may include one or more of: converting characters to a particular letter case; and removing one or more characters specified in a character blacklist.

In some implementations, obtaining a weighting value may include obtaining a weighting value based on an exponentially decaying weighting function.

In some implementations, the exponentially decaying weighting function may be configured to de-emphasize tokens having a higher frequency of occurrence.

In some implementations, the exponentially decaying weighting function may use a hyperparameter to de-emphasize tokens having a higher frequency of occurrence.

In some implementations, obtaining a weighting value may include performing a grid search.

In some implementations, obtaining embeddings for the identifier based on embeddings of tokens obtained by performing word tokenization on that identifier and based on the weighting value for such tokens may include: generating embeddings of each token in the plurality of tokens in the first set of tokens and the second set of tokens, the embeddings being a vectorized representation of the tokens; and generating the embeddings for one of the identifiers based on the embeddings for the tokens represented by that one of the identifiers.

In some implementations, the query may be an input of an identifier in the first identifier set. The user interface may be generated based a corresponding identifier in the second identifier set. The corresponding identifier may be identified based on the selected similarity profile.

In some implementations, the instructions may further configure the computing device to: perform word tokenization on identifiers in a third identifier set to obtain a third set of tokens; obtain a weighting value for each of a plurality of tokens in the third set of based on a frequency of occurrence; for each of a plurality of identifiers in the third identifier set, obtain embeddings for the identifier based on embeddings of tokens obtained by performing word tokenization on that identifier and based on the weighting value for such tokens; obtain similarity metrics for identifiers in the third identifier set and identifiers in the first identifier set based on the embeddings for such identifiers; and compare the similarity metrics obtained for the identifiers in the first identifier set and identifiers in the second identifier set to similarity metrics obtained to the identifiers in the third identifier set and identifiers in the first identifier set to map identifiers in the third identifier set that map to identifiers in the second identifier set.

In some implementations, obtaining a weighting value for each of a plurality of tokens in the first set of tokens and the second set of tokens based on a frequency of occurrence may include: combining the first set of tokens and the second set of tokens to obtain a dictionary of tokens; and determining the frequency of occurrence for each of the tokens in the dictionary of tokens, the frequency of occurrence indicating the frequency of occurrence in the first identifier set and the second identifier set.

In another aspect, there is provided a computer-implemented method. The method may include: performing word tokenization on identifiers in a first identifier set to obtain a first set of tokens; performing word tokenization on identifiers in a second identifier set to obtain a second set of tokens; obtaining a weighting value for each of a plurality of tokens in the first set of tokens and the second set of tokens based on a frequency of occurrence; for each identifier of a plurality of identifiers in the first identifier set and of a plurality of identifiers in the second identifier set, obtaining embeddings for the identifier based on the embeddings of tokens obtained by performing word tokenization on that identifier and based on the weighting value for such tokens; obtaining similarity metrics for identifiers in the first identifier set and identifiers in the second identifier set based on the embeddings for such identifiers; storing a similarity profile based on the similarity metrics for identifiers in the first identifier set, the similarity profile including data mapping one or more identifiers in the first identifier set to one or more identifiers in the second identifier set; receiving a query; and in real time in response to receiving the query, generating a user interface based on a selected similarity profile identified based on the query.

In some implementations, the method may include: prior to performing word tokenization on the identifiers in the first identifier set, pre-processing the first identifier set to standardize the identifiers in the first identifier set; and prior to performing word tokenization on the identifiers in the second identifier set, pre-processing the second identifier set to standardize the identifiers in the second identifier set.

In some implementations, pre-processing to standardize may include one or more of: converting characters to a particular letter case; and removing one or more characters specified in a character blacklist.

In some implementations, obtaining a weighting value may include obtaining a weighting value based on an exponentially decaying weighting function.

In some implementations, the exponentially decaying weighting function may be configured to de-emphasize tokens having a higher frequency of occurrence.

In some implementations, the exponentially decaying weighting function of the method may use a hyperparameter to de-emphasize tokens having a higher frequency of occurrence.

In some implementations, obtaining a weighting value of the method may include performing a grid search.

In some implementations, obtaining embeddings for the identifier based on embeddings of tokens obtained by performing word tokenization on that identifier and based on the weighting value for such tokens may include: generating embeddings of each token in the plurality of tokens in the first set of tokens and the second set of tokens, the embeddings being a vectorized representation of the tokens; and generating the embeddings for one of the identifiers based on the embeddings for the tokens represented by that one of the identifiers.

In some implementations, the query may be an input of an identifier in the first identifier set. The user interface may be generated based a corresponding identifier in the second identifier set. The corresponding identifier may be identified based on the selected similarity profile.

In another aspect, there is provided a computer-readable storage medium. The computer-readable storage medium may be a non-transitory computer-readable storage medium. The computer-readable storage medium may have stored thereon instructions which, when executed, configure a processor and/or a computer system to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

Systems and methods for providing identity data to remote computer systems using a payment network are described below.

FIG. 1 is a schematic operation diagram illustrating an operating environment of an example embodiment. FIG. 1 illustrates a system 100 for rapid handling of data requests.

As shown, the system 100 may include a computer system 110. The computer system 110 may be a rapid data handling system. In some implementations, the computer system 110 may be or include a gateway. In some implementations, the computer system 110 may be or include a server.

As shown, the computer system 110 may include or be in communication with one or more data sources. In the illustrated example, the computer system 110 is in communication with a first data source 140, a second data source 150, and a third data source 160. The data sources are illustrated as being directly coupled with the computer system 110 but, in other examples, one or more of the data sources 140, 150, 160 may be connected to the computer system 110 via a network 130. Further, in some examples one or more of the data sources 140, 150, 160 may be provided in integrated storage at the computer system 110.

While FIG. 1 illustrates three data sources 140, 150, 160, in practice the system 100 may include a greater or lesser number of data sources.

One or more of the data sources may store data that is indexed or otherwise referenced using identifiers. The identifiers that index the data in a particular data source may be collectively referred to as an identifier set or a set of identifiers. By way of example, the first data source 140 may store data that is indexed using identifiers in a first identifier set, the second data source 150 may store data that is indexed using identifiers in a second identifier set, and the third data source 160 may store data that is indexed using identifiers in a third identifier set.

The identifiers may, in at least some implementations, be or represent entity names. By way of example, the identifiers may be company names. Such company names can comprise of one of or combination of words, which can be made up of elements like letters, numerals, characters and other similar human readable or machine-readable symbols. The data sources 140, 150, 160 may, in at least some implementations, be maintained by different entities and/or systems that may be related or unrelated (e.g., a part of the same/different corporate affiliation and/or sharing a common/separate information/technology infrastructure). Consequently, there may be some variations in the identifiers that are used to identify a particular entity indexed within different data sources. By way of example, a particular entity may be identified as "ABC Corp" in one data source and "ABC Company" in another. Further, it may be that some identifiers for one data source have typographical errors and so they do not directly correspond to identifiers that are used to identify the same entity in another data source.

Data sources may include geographical data such as address data, contact information such as telephone number and messaging address information. Some data sources may provide other data. For example, one data source may be a news provider. Another data source may provide financial market information such as stock price information.

Since a single entity may be identified with different identifiers in different data sources, generating user interfaces that include data from more than one of the data sources 140, 150, 160 may prove difficult. For example, attempting to retrieve data from the first data source 140 using the identifier "ABC Company" may allow for successful data retrieval but using the same identifier at the second data source 150 may not allow for successful data retrieval since the second data source 150 may index that entity differently (e.g., using "ABC Corp" instead).

As will be described in greater detail below, the computer system 110 may be configured to efficiently retrieve data associated with a particular entity from multiple data sources even when there are differences in the identifiers used to index that particular entity at each of those data sources.

The data sources 140, 150, 160 may be or include memory such as persistent storage. Persistent storage may be, for example, flash memory, a hard disk drive, a solid-state drive or the like. The memory may store the data that is indexed using identifiers in an associated identifier set.

In at least some implementations, one or more of the data sources 140, 150, 160 may be a server computer system. The server computer system may, in at least some implementations, include an application programming interface (API) or another data retrieval interface which allows data to be retrieved by other systems such as the computer system 110.

The identifier sets which define the identifiers that may be used at a particular data source may be stored at the respective data sources and/or the identifier sets may be stored elsewhere. For example, one or more of the first identifier set, the second identifier set and the third identifier set may be stored at the computer system 110.

The computer system 110 may, in some implementations, be or include a server. The server may serve a user interface to one or more remote computer systems such as a client device 120. The client device 120 may, for example, provide a query or other request to the computer system 110 for a user interface that includes data for a particular entity and the computer system 110 may prepare and provide the requested user interface. The user interface may include data from multiple data sources 140, 150, 160. The data may be associated with an entity that is identified differently at different ones of the data sources.

In the illustrated example, the computer system 110 and the client device 120 are coupled to and communicate with one another via a network 130. The network 130 may be of various types. The network 130 may be a computer network. In some embodiments, the computer network may be an internetwork and may be formed of one or more interconnected computer networks. For example, the computer network may be or may include an Ethernet network, an asynchronous transfer mode (ATM) network, a wireless network, a telecommunications network or the like.

Figure 2:
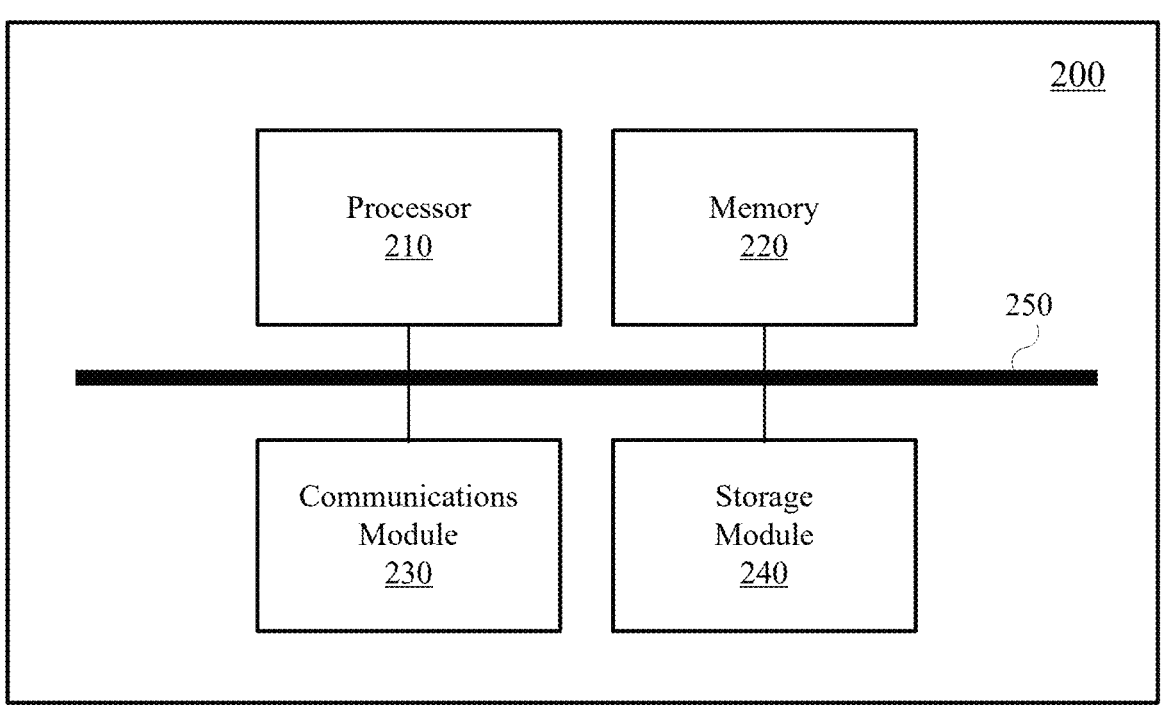
FIG. 2 is a high-level schematic diagram of an example computer device.

Referring now to FIG. 2, a high-level operation diagram of an example computer device 200 is shown. In some embodiments, the computer device 200 may be exemplary of one or more of the computer system 110, the first data source 140, the second data source 150, the third data source 160 and the client device 120.

The example computer device 200 includes a variety of modules. For example, as illustrated, the example computer device 200 may include a processor 210, a memory 220, a communications module 230, and/or a storage module 240. As illustrated, the foregoing example modules of the example computer device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 200.

The communications module 230 allows the example computer device 200 to communicate with other computer or computing devices and/or various communications networks. For example, the communications module 230 may allow the example computer device 200 to send or receive communications signals. Communications signals may be sent or received according to one or more protocols or according to one or more standards. For example, the communications module 230 may allow the example computer device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computer device 200 to communicate using near-field communication (NFC), via Wi-Fi™, using Bluetooth™ or via some combination of one or more networks or protocols. In some embodiments, all or a portion of the communications module 230 may be integrated into a component of the example computer device 200. For example, the communications module may be integrated into a communications chipset. In some embodiments, the communications module 230 may be omitted such as, for example, if sending and receiving communications is not required in a particular application.

The storage module 240 allows the example computer device 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persistent storage other than the persisted storage (if any) accessible via the memory 220. In some embodiments, the storage module 240 may be used to store and retrieve data in a database. A database may be stored in persistent storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access remotely stored data using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
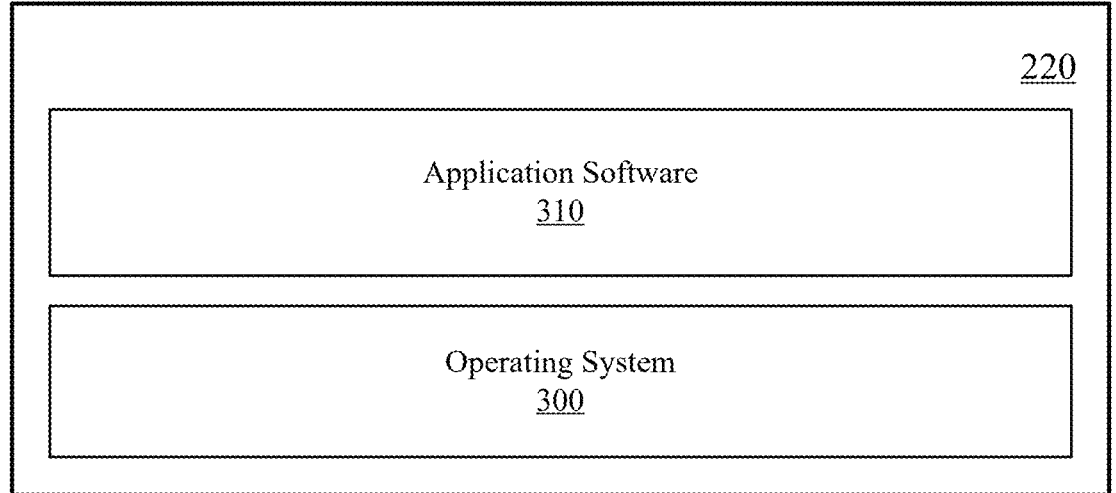
FIG. 3 shows a simplified organization of software components stored in a memory of the example computer device of FIG. 2.

FIG. 3 depicts a simplified organization of software components stored in the memory 220 of the example computer device 200 (FIG. 2). As illustrated, these software components include an operating system 300 and an application 310.

The operating system 300 is software. The operating system 300 allows the application 310 to access the processor 210 (FIG. 2), the memory 220, and the communications module 230 of the example computer device 200 (FIG. 2). The operating system 300 may be, for example, Google™ Android™, Apple™ iOS™, UNIX™, Linux™, Microsoft™ Windows™, Apple OSX™ or the like.

The application 310 adapts the example computer device 200, in combination with the operating system 300, to operate as a device performing a particular function. For example, the application 310 may cooperate with the operating system 300 to adapt a suitable embodiment of the example computer device 200 to operate as the computer system 110, the first data source 140, the second data source 150, the third data source 160 and/or the client device 120.

While a single application 310 is illustrated in FIG. 2, in operation the memory 220 may include more than one application 310 and different applications 310 may perform different operations.

Figure 4:
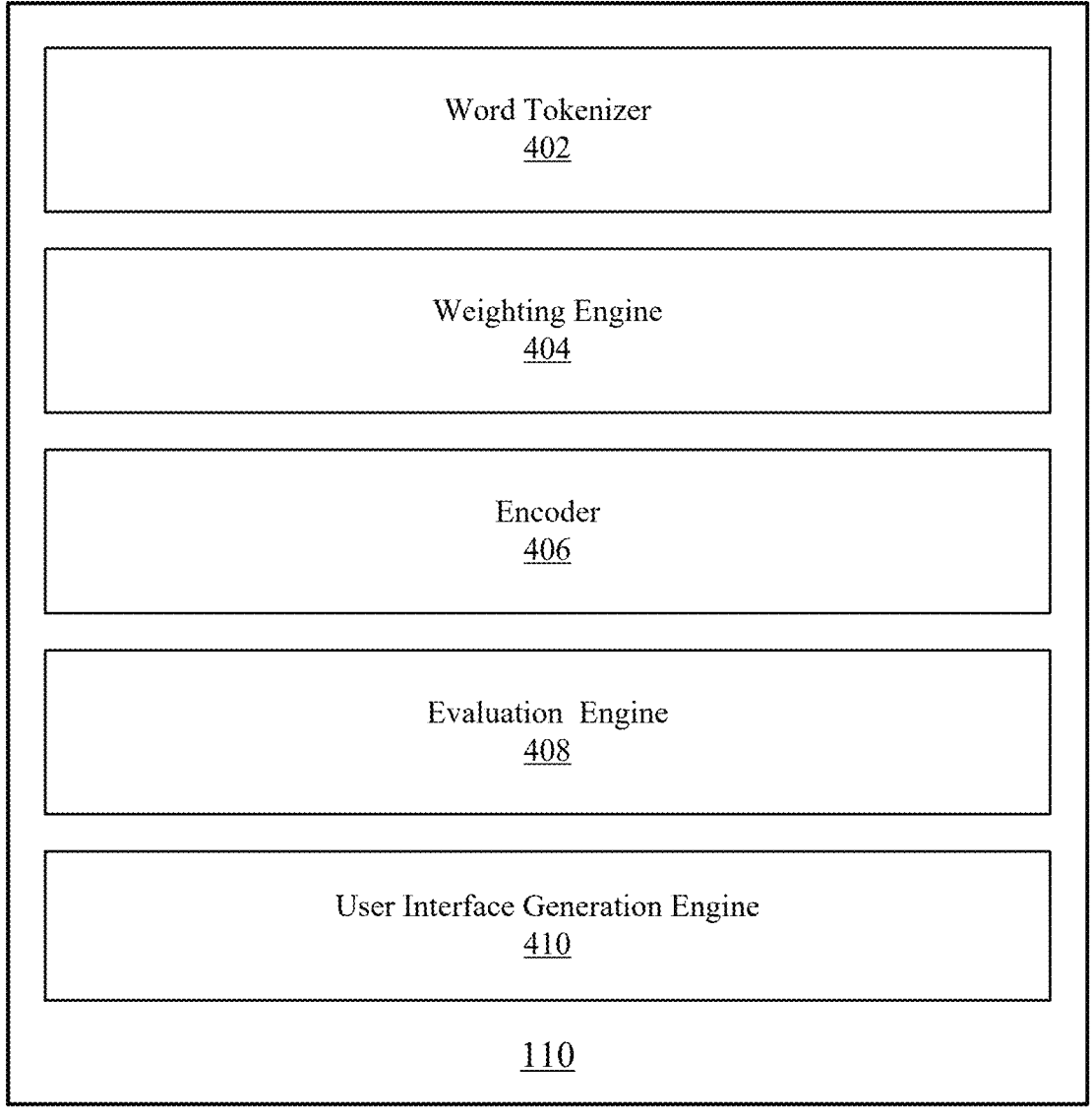
FIG. 4 is a block diagram showing example architecture of a rapid data handling system.

FIG. 4 is a block architecture diagram illustrating an architecture of the computer system 110. The various blocks may be or include software modules, hardware modules or both.

The architecture may include one or more of: a word tokenizer 402, a weighting engine 404, an encoder 406, an evaluation engine 408 and a user interface generation engine 410. The word tokenizer 402 may be configured to convert data into word tokens. The word tokenizer 402 may be used in methods that will be described below such as, for example, at operations 510 and 520 of a method 500 which will be described in greater detail with reference to FIG. 5.

The weighting engine 404 may be configured to assign a weighting value to one or more word tokens. The weighting engine 404 may be used in one or more methods described herein such as, for example, at an operation 530 of the method 500 of FIG. 5. The weighting engine 404 may, in some implementations, be configured to perform the method 600 of FIG. 6.

The encoder 406 may be configured to obtain embeddings of word tokens and/or identifiers. For example, the encoder 406 may be configured to obtain embeddings in the form of a vector representation of the identifiers. The encoder 406 may be used during an operation 540 of the method 500 of FIG. 5 as will be described in greater detail below.

The evaluation engine 408 may be configured to obtain similarity metrics. For example, the evaluation engine 408 may evaluate the embeddings for two or more identifiers to determine whether the identifiers are related or associated with one another. The evaluation engine may, for example, be used during an operation 550 of the method 500 of FIG. 5 as will be described in greater detail below.

The user interface generation engine 410 may be configured to receive a query or other request and to provide a user interface in response to that query or other request. The user interface may be provided using a similarity profile. For example, the user interface generation engine 410 may receive a query/request, may use that query/request to retrieve corresponding similarity profile data, and it may use that similarity profile data to identify an identifier or identifiers that may be used at a data source. The identified identifier(s) may be different from an identifier specified in the query/request. For example, the query/request may use an identifier that is supported at one data source and the user interface generation engine 410 may use the similarity profile to identify a related identifier that is supported at another data source (but not necessarily supported or recognized at any other data source) and use that related identifier to retrieve data from the another data source and to include such data in the generated user interface. The user interface generation engine 410 may be used, for example, at an operation 570 of the method 500, which will be described in greater detail below with reference to FIG. 5.

Figure 5:
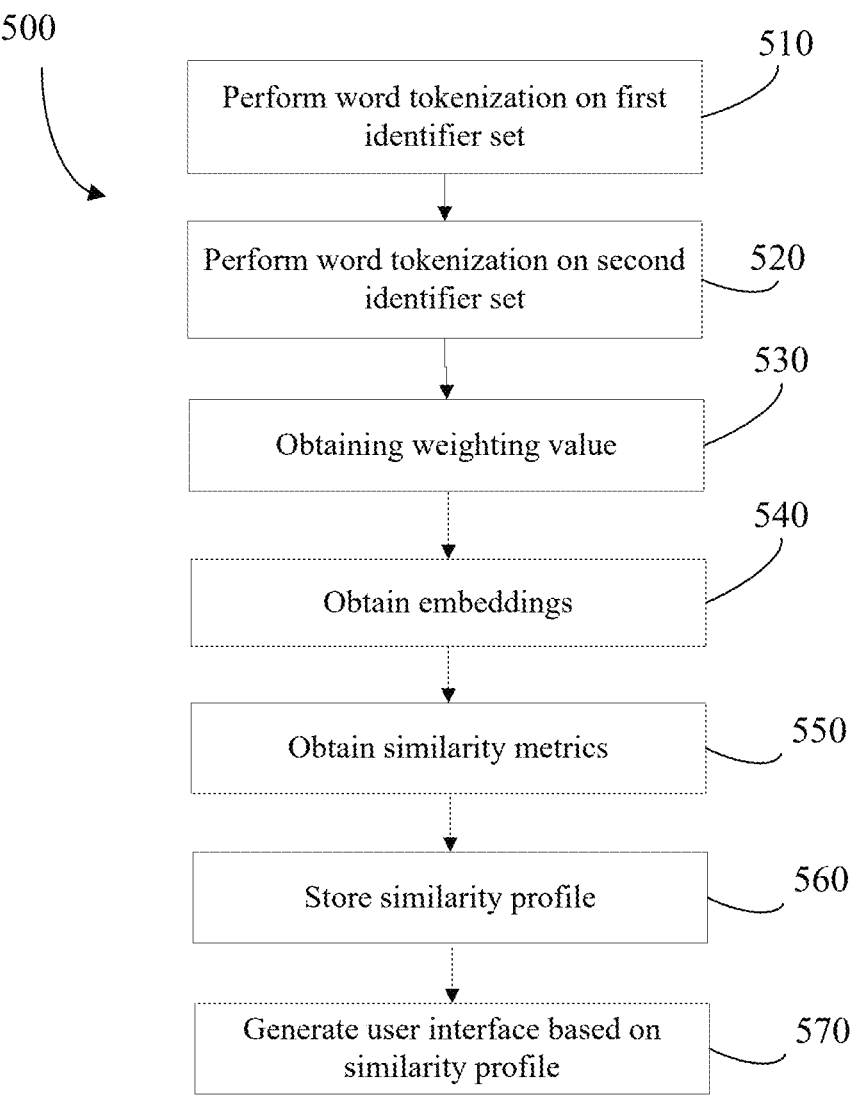
FIG. 5 is a flowchart showing operations performed by a computer system in providing a user interface.

FIG. 5 is a flowchart showing operations performed by a computer system, such as the computer system 110. The operations may be included in a method 500 which may be performed by the computer system 110. For example, computer-executable instructions stored in memory of the computer system 110 may, when executed by the processor of the computer system 110, configure the computer system 110 to perform the method 500 or a portion thereof.

At operation 510, the method 500 includes performing word tokenization on identifiers in a first identifier set to obtain a first set of tokens. Word tokenization may be performed by splitting the identifiers into words. By way of example, the identifier "Toronto Dominion Bank" may be separated or tokenized into three word tokens: [Toronto, Dominion, Bank].

The separating is be performed by the computer system 110. For example, the computer system 110 may perform the word tokenization on each of the identifiers in the first identifier set by identifying one or more word delimiters in the identifiers. The word delimiters may be or include a whitespace indicator, such as the space character.

The identifiers in the first identifier set may, in at least some implementations, be entity names. By way of example, the identifiers may be corporate identifiers such as company names. The first identifier set may be a master and/or primary dataset. The master/primary dataset may be considered to be a source of truth. The source of truth may be a dataset that is considered or expected to have the least amount of errors or regraded as a reference standard. In an implementation, the first dataset may be a Bloomberg™ corporate structure file in which the associated company names and other information published by Bloomberg can be considered as the reference standard or having the least amount of errors.

The operation 510 may be performed to obtain a first set of word tokens. The operation may be performed, for example, using the word tokenizer 402 (FIG. 4). The word tokenizer 402 may receive, as an input, the first identifier set, and may produce, as an output, the first set of word tokens.

Next, at an operation 520, the method 500 includes performing word tokenization on a second identifier set. The identifiers in the second identifier set may be or include entity names such as company names or other corporate identifiers. The second identifier set may be a secondary dataset which may not be considered to a source of truth. Rather, the second identifier set may be expected to include at least some errors or inconsistencies relative to the first identifier set.

The operation 520 may be performed to obtain a second set of tokens. Operation 520 may be performed similar to the operation 510. For example, the computer system 110 may perform the word tokenization at operation 520 by splitting the identifiers in the second identifier set into a plurality of words by identifying word delimiters.

In at least some implementations, the operation 520 may be performed, for example, by or using the word tokenizer 402 of FIG. 4. The word tokenizer 402 may receive the second identifier set as an input and may generate the second set of tokens as an output.

Next, at an operation 530, the method 500 may include obtaining one or more weighting values in the first set of tokens and the second set of tokens. That is weighting values may be obtained for one or more tokens that were generated at the operations 510 and 520. The weighting values may be determined based on a frequency of occurrence of the tokens.

Figure 6:
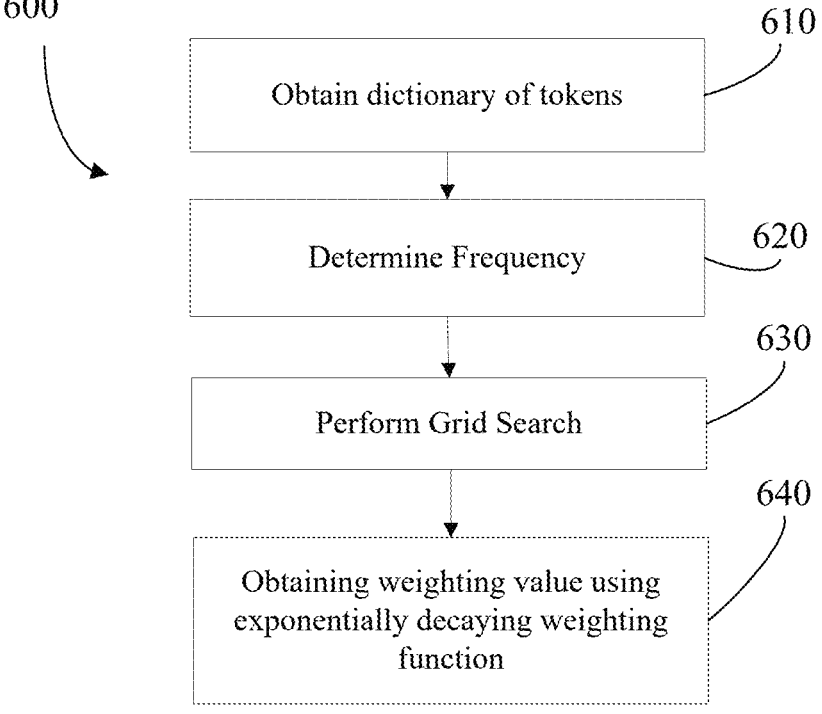
FIG. 6 is a flowchart showing operations performed by a computer system in obtaining weighting values.

Various methods may be used to identify weighting values. An example of one such method 600 is illustrated in FIG. 6. The method 600 or a portion thereof may be performed during or as part of the operation 530 of the method 500 of FIG. 5.

FIG. 6 is a flowchart showing operations performed by a computer system, such as the computer system 110. The operations may be included in a method 600 which may be performed by the computer system 110. For example, computer-executable instructions stored in memory of the computer system 110 may, when executed by the processor of the computer system 110, configure the computer system 110 to perform the method 600 or a portion thereof.

At an operation 610, the computer system 110 may obtain a dictionary of tokens. The dictionary of tokens may be obtained by combining the first set of tokens and the second set of tokens. That is, the dictionary of tokens may be a composite set that includes both the first set of tokens and the second set of tokens.

After a dictionary of tokens has been obtained, a frequency of occurrence may be determined by the computer system 110 at an operation 620. The frequency of occurrence may indicate the frequency of occurrence of each of the tokens in the dictionary of tokens in the first identifier set and the second identifier set. The frequency of occurrence is a metric that indicates how often a particular word token is present in the first identifier set and the second identifier set. The frequency may be expressed in a number of ways including, for example, as a frequency (e.g., the amount of times the token is present relative to the total amount of tokens), as an absolute number, or using another metric.

In some implementations the computer system 110 may perform clustering on tokens in the dictionary of tokens. The clustering may be performed based on one or more cluster definition parameters. The cluster definition parameters may, for example, cluster tokens that are singular and plural representation of the same term. For example, the word token "bank" may be clustered with "banks". The clustering may be performed prior to determining the frequency of occurrence at the operation 620 so that the frequency of occurrence may account for all versions of the token that are in a particular cluster. For example, the frequency of occurrence of "bank" and "banks" may be considered together. In some implementations, the clustering may be performed after determining the frequency of occurrence at the operation 620. For example, the frequency of occurrence of a first token in the cluster and the frequency of occurrence of a second token in the cluster may be combined to obtain a frequency of occurrence for the cluster.

In at least some implementations, the computer system 110 may be configured to tune hyper values. For example, the computer system may, at an operation 630 of the method 600, perform a grid search. The grid search may generate candidates from a grid of parameter values.

The grid search may be performed to identify an appropriate hyperparameter value that is to be used for a weighting function. The grid search may be selected, for example, by evaluating a weighting function using various hyperparameters and determining which hyperparameter provided the most accurate results when used in the weighting function. For example, the grid search may be performed by performing operations 640, 540, 550, which will be described in greater detail below, for various candidate hyperparameters and then selecting one of the candidate hyperparameters as yielding the best similarity metrics. This candidate hyperparameter then becomes the hyperparameter that will be used in the weighting function during ordinary operation of the method 600.

In at least some implementations, the hyperparameter, which may also be referred to as a hyperparameter value, may be used in an exponentially decaying weighting function. The exponentially decaying weighting function de-emphasises word tokens that have a high frequency of occurrence. The hyperparameter ensures that such high frequency tokens are de-emphasized but not eliminated. As a result of this de-emphasis, tokens that represent words that are more unique or distinctive will become more pronounced. That is, such tokens may be given greater weight, and thereby improving the determination of the similarity metrics and to enable relatively higher accuracy of data retrieval across different data sources compared to no token de-emphasis.

Referring still to FIG. 6, the computer system 110 may, at an operation 640, obtain one or more weighting values based on the exponentially decaying weighting function. The exponentially decaying function may be configured to de-emphasize tokens having a higher frequency of occurrence. The exponentially decaying weighting function may use the hyperparameter determined using the grid search at operation 630 (or the candidate hyperparameter where at iteration of operation 640 is being performed as part of the grid search). More specifically, as noted above, the hyperparameter may be used to de-emphasize tokens having a higher frequency of occurrence. By way of example, where the identifiers include company names, commonly used terms such as Inc., Co., Corp., LLC, or Ltd. may be de-emphasized using the exponentially decaying weighting function, but they are not discounted entirely.

In one implementation, the exponentially decaying function that may be used to determine a weighting value, W, for a particular token may be of the following form:

$$W = e^{-\frac{x}{a}}$$

where x is the frequency of occurrence of the token, a is the hyperparameter, and e is Euler's number. A different constant may be used instead of Euler's constant in other implementations.

In at least some implementations, the weighting value may be obtained for each of a plurality of the tokens. For example, a dictionary of token weightings may be created by applying the exponentially decaying function to each token.

The method 600 of FIG. 6 may, as noted above, be performed during the operation 530 of the method 500 of FIG. 5. The method 600 or a portion thereof may be performed by a weighting engine 404 (FIG. 4). The weighting engine 404 may receive, as input, a token set, such as the dictionary of tokens generated at the operation 610 and/or the first set of tokens and/or the second set of tokens. The weighting engine 404 may generate, as an output, a plurality of weighting values such as the dictionary of token weightings described above. For example, the weighting engine 404 may output a file that associates each token with a weighting value for that token.

Referring again to FIG. 5, the method 500 may include, at an operation 540, obtaining embeddings for identifiers in the first identifier set and for identifiers in the second identifier set. For example, the computer system 110 may, for each identifier of a plurality of identifiers in the first identifier set and of a plurality of identifiers in the second identifier set, obtain embeddings. The embeddings for an identifier may be obtained based on embeddings of tokens obtained by performing word tokenization on that identifier. For example, for a given identifier, an embedding may be obtained for each word token in that identifier and then an overall embedding for the identifier itself may be obtained based on the embeddings for all of the word tokens in the identifier. The embedding for the individual tokens may also be obtained based on the weighting value for such individual tokens and, in this way, the embedding for the overall identifier may factor in the weighting values for the tokens that make up the identifier.

An embedding for a token may be generated using an encoder. The encoder may take a variety of forms. In one example, the encoder may be a Universal Sentence Encoder model. The Universal Sentence Encoder module may be generated using a TensorFlow™ hub library. Using this model, each embedding is a vectorized representation of the token in 512 dimensions. In another example, a FinBERT™ embedding may be used.

Accordingly, the operation 540 may be performed in stages. First, embeddings of each token in the plurality of tokens in the first set of tokens and in the second set of tokens may be generated or otherwise obtained using an encoder. These embeddings may be a vectorized representation of the tokens. The generated embeddings for a token may then be multiplied by the weighting value for that token (as determined at the operation 530) to obtain weighted embeddings. Then, the embeddings of an identifier may be generated based on the embeddings of the tokens making up that identifier, such as the weighted embeddings for all of the tokens in that identifier. For example, the embeddings of an identifier may be generated by adding all of the weighted embeddings for all of the tokens in that identifier.

In at least some implementations, embeddings for all identifiers in the first identifier set and in the second identifier set may be generated using the technique described above.

The embeddings for an identifier may, in some implementations, be further processed to normalize the embeddings. For example, the embeddings for an identifier may be divided by the square root of the number of tokens in the identifier.

The operation 540 may, in at least some implementations, be performed by the encoder 406. The encoder 406 may receive, as inputs, one or more of the identifier sets and, in at least some implementations, weighting values such as the dictionary of token weightings. The encoder 406 may provide, as an output, embeddings. The embeddings that are output may be embeddings of one or more of the identifiers in the identifier sets.

In at least some implementations, the embeddings may be obtained for all identifiers in the first identifier set and also for all identifiers in the second identifier set.

At an operation 550 of the method 500, the computer system 110 may obtain similarity metrics for identifiers in the first identifier set and identifiers in the second identifier set. The similarity metrics may be obtained based on the embeddings for such identifiers. By way of example, the embeddings of a selected one of the identifiers in the second identifier set may be compared to the embeddings of each identifier in the first identifier set. The comparison may be performed by generating similarity metrics that define a degree of similarity between such identifiers. The similarity metrics may be determined for each pair of identifiers that includes one identifier from the first identifier set and one identifier from the second identifier set.

The similarity metrics for a pair of identifiers may be represented with a corresponding cosine similarity value obtainable using a cosine similarity function, for example. In another example, a semantic search library may be used to evaluate similarity. For example, the Facebook™ AI semantic search library (FAISS) may be used to determine the similarity metrics.

The similarity metrics may numerically indicate a degree of similarity between identifiers. In at least some implementations, the similarity metrics may be obtained by the evaluation engine 408 of FIG. 4. The evaluation engine 408 may receive, as an input, the output from the encoder 406, such as the embeddings, and it may output similarly metrics.

In at least some implementations, the method 500 may include, at an operation 560, storing a similarity profile. The similarity profile may be stored in memory that is provided on or accessible by the computer system 110.

The similarity profile may be based on the similarity metrics for identifiers in the first identifier set. For example, a similarity profile for an identifier in the second identifier set may contain a collection of similarity metrics describing similarities between that identifier and identifiers in the first identifier set. In at least some implementations, the similarity metrics that are obtained at the operation 550 and/or the similarity profile that is stored at the operation 560 may be or include mapping data. The mapping data may be data that maps one or more of the identifiers in the second identifier set to corresponding identifiers in the first identifier set or, put differently, one or more identifiers in the first identifier set to one or more identifiers in the second identifier set. In some implementations, the mapping data may indicate which identifier in the first identifier set is most similar to an identifier in the second identifier set. In some implementations and for some identifiers, the mapping data may be a one-to-one mapping. In other implementations and/or for other identifiers, the mapping data may map one identifier in one of the identifier sets to a plurality of identifiers in one or more other identifier sets. For example, the mapping data may map an identifier in one of the identifier sets to the top five matches belonging to the other of the identifier sets. The mapped identifiers may represent the closest matches.

In some implementations, other supplemental data may be used to improve the determination of similarity metrics and/or similarity profiles. For example, in the case where identifiers relate to entity names, a country of incorporation and/or address information that is associated with each identifier in the first identifier set may be compared to a country of incorporation and/or address information that is associated with each identifier in the second identifier set. For example, if a country of incorporation and/or an address associated with an identifier in the first identifier set does not correspond to a country of incorporation and/or an address associated with an identifier in the second identifier set, then the mapping data may indicate that those identifiers are not related. In some implementations, supplemental data can further be considered as a factor in modifying the similarity scores generated when identifiers are compared between different sets.

After the similarity metrics are stored, they may be used to generate a user interface. For example, the computer system 110 may receive a query. The query may be received, for example, from a client device 120. In at least some implementations, the query may be received via the network 130. The query may be, in some implementations, an HTTP request. For example, the query may request retrieval of a user interface which includes both data from a first data source 140 and data from a second data source 150. The data from the first data source and the data from the second data source may be associated with a common entity but the first data source and the second data source may associate that entity with different identifiers. However, even though the data sources use different identifiers for the same entity, the computer system 110 may, at an operation 570, generate, in real time, a user interface based on a selected similarity profile. The selected similarity profile may be identified based on the query. For example, in some implementations, the query may be an input of an identifier in the first identifier set and the computer system 110 may retrieve data from both the first data source 140 (using the inputted identifier) and data from the second data source 150, which may be obtained using an identifier identified using the similarity profile associated with the inputted identifier. In this way, the user interface may be generated based on a corresponding identifier in the second identifier set. The corresponding identifier may be based on a selected similarity profile, for example, indicating that the corresponding identifier has the highest degree of similarity with the inputted identifier provided in the query.

Conveniently, since the similarity profile has been stored before the query is received, the query may be processed rapidly. The similarity profile may be generated in real time so that the user interface is provided instantly.

In another example of how the operation 570 may be performed, a query or other retrieval instruction may in some implementations be received at the computer system 110 and the query or other retrieval instruction may specify an identifier from a first identifier set and the user interface that is provided may be based on a corresponding identifier in the second identifier set, as determined using the similarity profile. In another example, a query or other retrieval instruction may be received at the computer system and the query or other retrieval instruction may specify an identifier from the second identifier set and the user interface that is provided may be based on a corresponding identifier in the first identifier set, as determined using the similarity profile.

In at least some implementations, the similarity metrics may be obtained by a user interface generation engine 410 (FIG. 4). The user interface generation engine 410 may receive, as an input, a query and it may retrieve data from data sources based on the query and provide the user interface as an output. The user interface may be provided, for example, to the client device 120.

Figure 7:
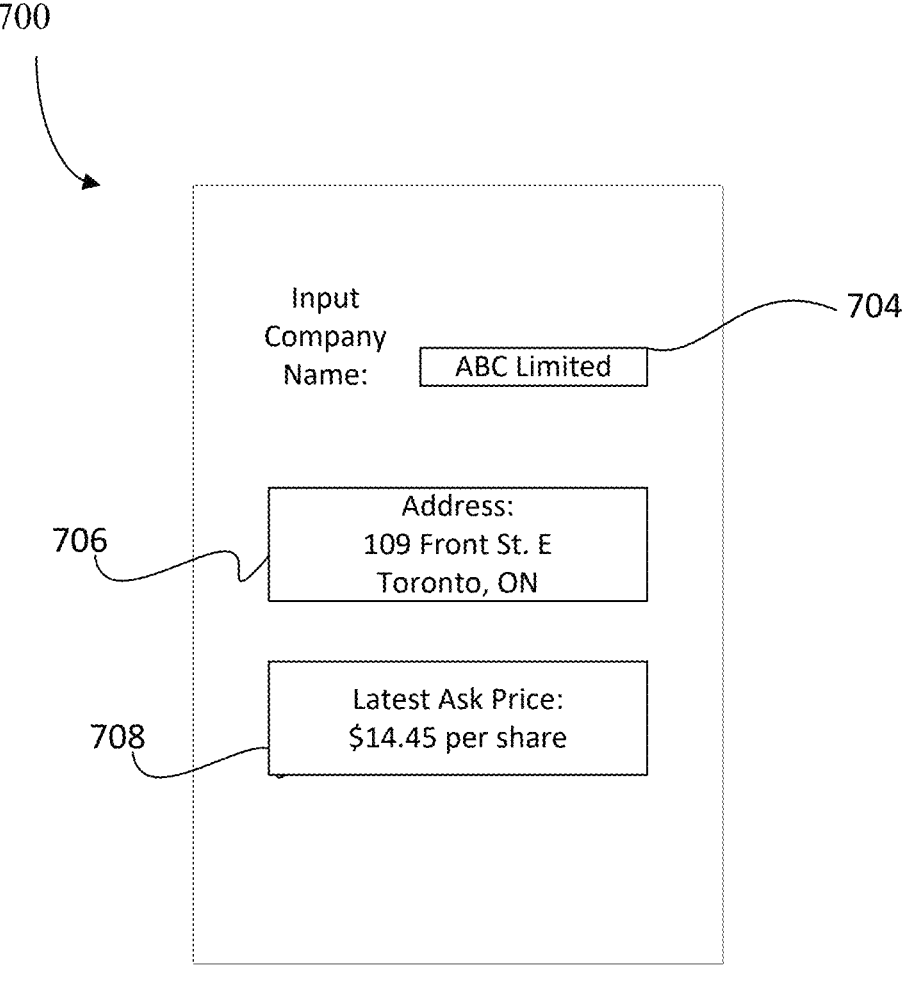
FIG. 7 is an example user interface in accordance with example embodiments.

Reference will now be made to FIG. 7 which illustrates an example user interface 700. The example user interface may, for example, be displayed in response to a query which may be input via an input interface 704 of the user interface 700. The input interface 704 may be, for example, an input field.

The user interface may be generated to include first data 706 from a first data source 140 and second data 708 from a second data source 150. Both the first data 706 and the second data 708 may be associated with a common entity but the first data source 140 may use a different identifier to track that entity than the second data source 150. By way of example, in the illustrated example, the inputted query is "ABC Limited" and it may be that the first data source 140 uses identifier "ABC Limited" for the desired entity but the second data source uses identifier "ABC" only. Despite this difference in identifiers, the computer system 110 may generate the user interface 700 in real time due to the stored similarity profile for ABC Limited.

Figure 8:
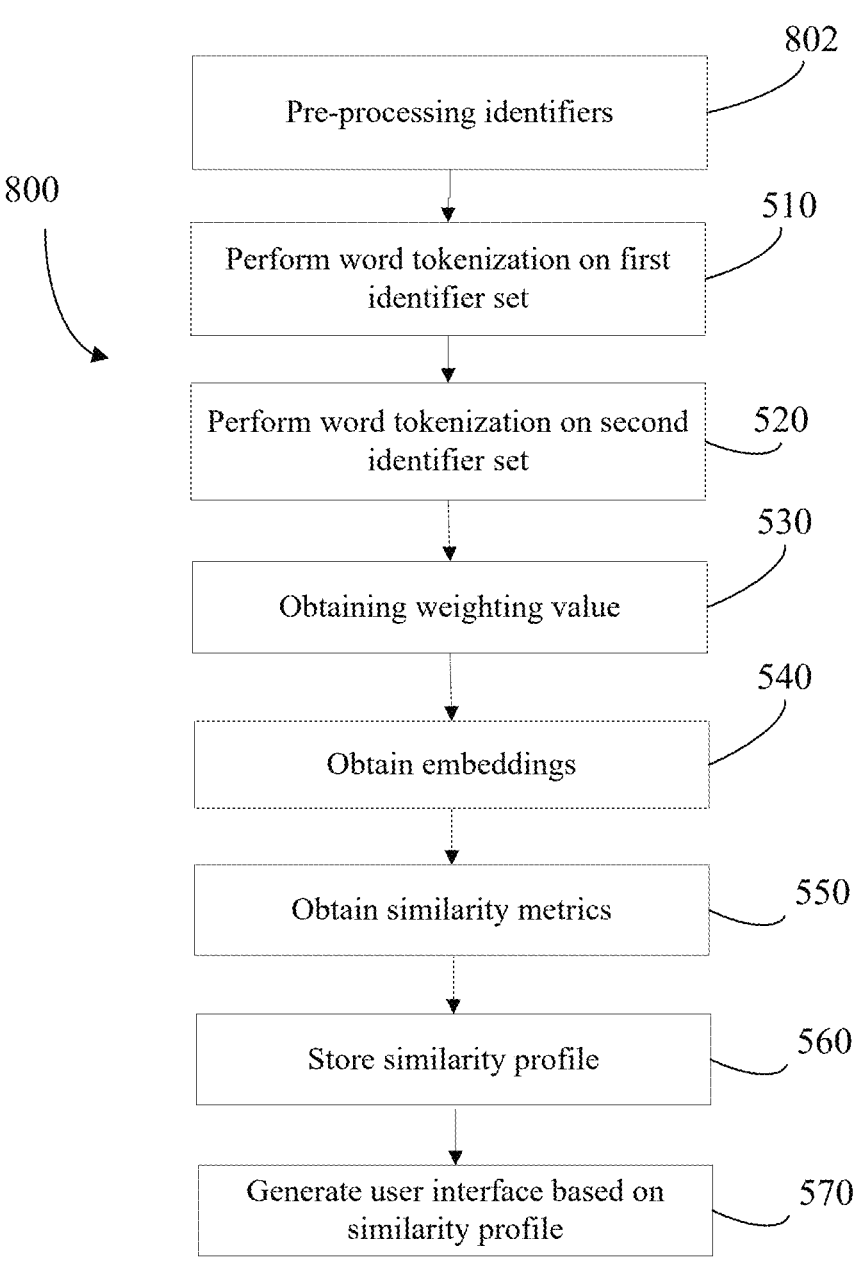
FIG. 8 is a flowchart showing operations performed by a computer system in providing a user interface.

Reference will now be made to FIG. 8. FIG. 8 is a flowchart showing operations performed by a computer system, such as the computer system 110 of FIG. 1. The operations may be included in a method 800 which may be performed by the computer system 110. For example, computer-executable instructions stored in memory of the computer system 110 may, when executed by the processor of the computer system 110, configure the computer system 110 to perform the method 800 or a portion thereof.

The method 800 of FIG. 8 includes many operations in common with the method 500 of FIG. 5. Such operations are illustrated using common reference numerals and the discussion of such operations will not be repeated at length.

The method 800 of FIG. 8 may include, at an operation 802, pre-processing one or more identifiers. For example, prior to performing word tokenization on the identifiers in the first identifier set at the operation 510, the computer system 110 may pre-process the first identifier set to standardize the identifiers in the first identifier set. Similarly, prior to performing word tokenization on the identifiers in the second identifier set at the operation 520, the computer system 110 may pre-process the second identifier set to standardize the identifiers in the second identifier set.

Pre-processing may include, for example, any one or more of: converting characters to a particular letter case, and removing one or more characters specified in a list, such as a character blacklist. For example, pre-processing may include converting all characters to uppercase, converting all characters to lowercase, converting certain characters to uppercase (such as a first letter of each word), or converting certain letters to lowercase (such as characters other than the first letter of each word). Pre-processing may, additionally or alternatively, include removing one or more characters in a list. Such characters may be or include punctuation characters or special characters. By way of example, one or more of the following characters may be removed: !, @, $, %, ^, &, *, (.), {, }, [,], _, -, +, =, ;, :, ",", /, ?, <, >, |, \. Other characters may be removed in other implementations.

After the pre-processing has been performed at the operation 802, the subsequent operations of the method 800 may be performed based on the identifier sets that have been modified by the pre-processing.

Figure 9:
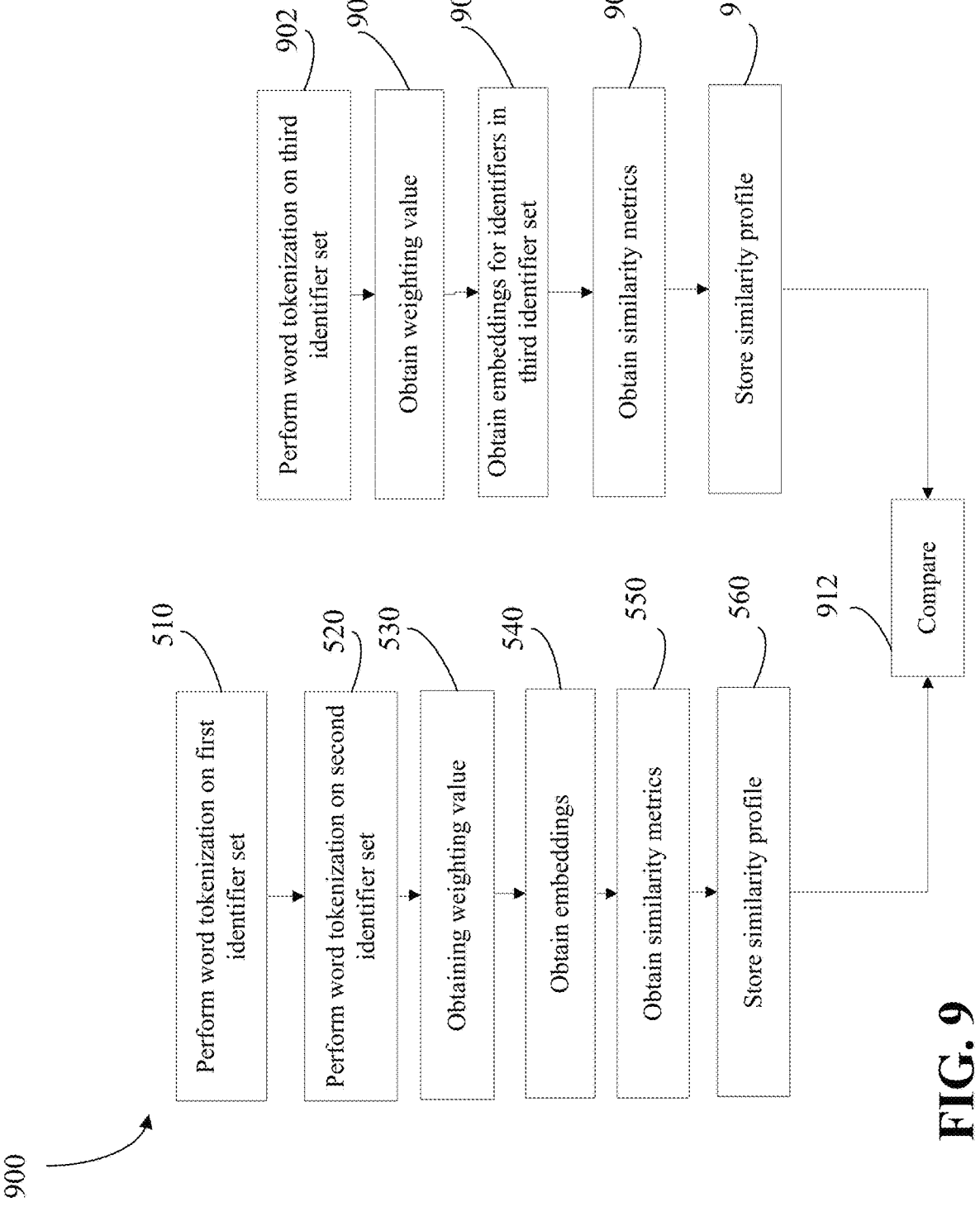
FIG. 9 is a flowchart showing operations performed by a computer system in providing a user interface.

Reference will now be made to FIG. 9. FIG. 9 is a flowchart showing operations performed by a computer system, such as the computer system 110 of FIG. 1. The operations may be included in a method 900 which may be performed by the computer system 110. For example, computer-executable instructions stored in memory of the computer system 110 may, when executed by the processor of the computer system 110, configure the computer system 110 to perform the method 900 or a portion thereof.

The method 900 of FIG. 9 may be used where there are more than two data sources. For example, the method 900 may be used when there are three or more data sources. In an illustrated example, a first data source 140 may be associated with a first identifier set, a second data source 150 may be associated with a second identifier set, and a third data source 160 may be associated with a third identifier set. The method 900 may be performed to map identifiers of both a second identifier set and third identifier set to those in a first identifier set. The first identifier set may be regarded as the golden source of truth.

The method 900 of FIG. 9 includes many operations in common with the method 500 of FIG. 5. Such operations are illustrated using common reference numerals and the discussion of such operations will not be repeated at length.

The method 900 may include the operations 510 to 560 of the method 500 or a variation thereof. Further, while not illustrated in FIG. 9, the method 900 may include the pre-processing operation 802 of FIG. 8.

The method 900 may include an operation 902. At the operation 902, the computer system 110 may perform word tokenization on identifiers in a third identifier set to obtain a third set of tokens. The word tokenization at the operation 902 may be performed in the same or in a similar manner to the word tokenization at the operations 510, 520.

The operation 902 may, in some implementations, be performed at another sequence in the method 900. For example, the operation 902 may be performed together with the operations 510, 520, or even after the operation 560.

Next, at an operation 904, the method 900 may include obtaining a weighting value for each of a plurality of tokens in the third identifier set based on a frequency of occurrence. The operation 904 may be performed similar to the operation 530. For example, the method 600 of FIG. 6 may be performed to obtain the weighting value.

At an operation 906, the computer system 110 may, for each of a plurality of identifiers in the third identifier set, obtain embeddings for the identifier based on the embeddings of tokens obtained by performing word tokenization on that identifier and based on the weighting value for such tokens. The operation 906 may be performed similar to the operation 540.

Next, at an operation 908, the computer system 110 may obtain similarity metrics for identifiers in the third identifier set and identifiers in the first identifier set based on the embeddings for such identifiers. Operation 908 may be performed similar to the operation 550.

Next, at an operation 910, the computer system 110 may store a similarity profile for the third identifier set. Operation 910 may be performed similar to the operation 560. The similarity profile for the third identifier set may map identifiers in the third identifier set to corresponding identifiers in one or both of the first and second identifier set.

Once a similarity profile that effectively maps identifiers in the second identifier set to those in the first identifier set has been stored at the operation 560 and a similarity profile that effectively maps identifiers in the third identifier set to those in the first identifier set has been stored at the operation 910, the similarity profiles may be used to identify related identifiers in the second and third identifier sets.

For example, a comparison operation 912 may be performed. This operation 912 may, in some implementations, be performed as part of an operation of generating a user interface, similar to the operation 570 of the method 500 of FIG. 5. In some implementations, at the operation 912, the computer system 110 may compare the similarity metrics or profile obtained for the identifiers in the first identifier set and identifiers in the second identifier set to similarity metrics or profile obtained for the identifiers in the third identifier set and identifiers in the first identifier set to map identifiers in the third identifier set that map to identifiers in the second identifier set. The comparison may be or include a semantic search.

Notably, even though the similarity metrics obtained at the operation 908 map identifiers in the first identifier set to those in the third identifier set and the similarity metrics obtained at the operation 550 map the identifiers in the second identifier set to those in the first identifier set, the computer system 110 may relate the identifiers in the third identifier set to those in the second identifier set. For example, when an identifier in the first identifier set and an identifier in the second identifier set map to a common identifier (or map to enough common identifiers), then they may be determined to be associated with one another.

At the operation 912, the computer system 110 may store a similarity profile for the third identifier set.

While not illustrated in FIG. 9, the method 900 may also include operation 570 of the method 500. For example, a query may be received which uses an identifier in the first or second identifier sets and a user interface may be generated based on an associated identifier in the third identifier set.

In some implementations, whenever new identifiers are added to or existing identifiers are removed or modified from any one of the first identifier set, second identifier set or third identifier set, the computer system 110 may be configured to automatically perform any one or more of methods 500, 600, 800 or 900 to obtain updated similarity profiles. For example, if a company name is changed as a result of corporate rebranding, restructuring or acquisition (e.g., Facebook™ changing its name to Meta™) the relevant identifier sets may be updated along with their corresponding similarity profiles and mapping data (e.g., identifier for "Facebook" may be mapped to identifier for "Meta"). These updates can be performed in real-time whenever a change is detected by computer system 110 or on a defined schedule such as hourly, daily, weekly, etc., thereby allowing computer system 110 to adapt rapidly to changes in the way underlying data is indexed over time to rapidly retrieve data from one or more data sources with accuracy.

Conveniently, one or more methods and/or systems described herein may be used to rapidly generate appropriate user interfaces in response to a query. Additionally or alternatively, some methods and system described herein may be used to match specific entities from various sources using general language model embeddings, without domain adaptation on specific domain or fine tuning of embeddings. This may avoid the computational overhead associated with domain adaption or fine tuning of embeddings. Further, at least some methods and system described herein may result in improved accuracy of data retrieval since tokens in entity names are automatically de-emphasized or emphasized based on frequency of use. Additionally or alternatively, techniques described herein are optimized for speed and memory usage. Such techniques may find similar entities from a dataset of even billions of entities.

The methods described above may be modified and/or operations of such methods combined to provide other methods.

Any examples involving a general purpose computer, aspects of this application transform the general-purpose computer into a special-purpose computing device when configured to execute the instructions described herein.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computing device comprising:
a communications module;
a processor coupled with the communications module; and
a memory coupled to the processor and storing processor-executable instructions which, when executed by the processor, configure the computing device to:
perform word tokenization on corporate identifiers in a first identifier set to obtain a first set of tokens wherein the first identifier set is based on a corporate structure file which includes one or more of a company name, a country of incorporation and an address;
perform word tokenization on identifiers in a second identifier set to obtain a second set of tokens;
obtain a weighting value for each of a plurality of tokens in the first set of tokens and the second set of tokens based on a frequency of occurrence while deemphasizing the weighting value of corporate suffix tokens indicating legal entity form;

for each corporate identifier of a plurality of corporate identifiers in the first identifier set and of a plurality of identifiers in the second identifier set, obtain embeddings for the identifier based on embeddings of tokens obtained by performing word tokenization on that identifier and based on the weighting value for such tokens;
obtain similarity metrics for corporate identifiers in the first identifier set and identifiers in the second identifier set based on the embeddings for such identifiers;
store a similarity profile based on the similarity metrics for corporate identifiers in the first identifier set, the similarity profile including data mapping one or more corporate identifiers in the first identifier set to one or more identifiers in the second identifier set;
receive a query; and
generate a user interface based on a selected similarity profile identified based on the query.

2. The computing device of claim 1, wherein the instructions further configure the computing device to:
prior to performing word tokenization on the corporate identifiers in the first identifier set, pre-processing the first identifier set to standardize the corporate identifiers in the first identifier set; and
prior to performing word tokenization on the identifiers in the second identifier set, pre-processing the second identifier set to standardize the identifiers in the second identifier set.

3. The computing device of claim 2, wherein pre-processing to standardize includes one or more of:
converting characters to a particular letter case; and
removing one or more characters specified in a character blacklist.

4. The computing device of claim 1, wherein obtain a weighting value includes obtaining a weighting value based on an exponentially decaying weighting function.

5. The computing device of claim 4, wherein the exponentially decaying weighting function is configured to de-emphasize tokens having a higher frequency of occurrence.

6. The computing device of claim 5, wherein the exponentially decaying weighting function uses a hyperparameter to de-emphasize tokens having a higher frequency of occurrence.

7. The computing device of claim 6, wherein obtain a weighting value includes performing a grid search.

8. The computing device of claim 1, wherein obtaining embeddings for the identifier based on embeddings of tokens obtained by performing word tokenization on that identifier and based on the weighting value for such tokens includes:
generating embeddings of each token in the plurality of tokens in the first set of tokens and the second set of tokens, the embeddings being a vectorized representation of the tokens; and
generating the embeddings for one of the identifiers based on the embeddings for the tokens represented by that one of the identifiers.

9. The computing device of claim 1, wherein the query is an input of a corporate identifier in the first identifier set and wherein the user interface is generated based a corresponding identifier in the second identifier set, the corresponding identifier identified based on the selected similarity profile.

10. The computing device of claim 1, wherein the instructions further configure the computing device to:
perform word tokenization on identifiers in a third identifier set to obtain a third set of tokens;
obtain a weighting value for each of a plurality of tokens in the third set of based on a frequency of occurrence;

for each of a plurality of identifiers in the third identifier set, obtain embeddings for the identifier based on embeddings of tokens obtained by performing word tokenization on that identifier and based on the weighting value for such tokens;

obtain similarity metrics for identifiers in the third identifier set and corporate identifiers in the first identifier set based on the embeddings for such identifiers; and compare the similarity metrics obtained for the corporate identifiers in the first identifier set and identifiers in the second identifier set to similarity metrics obtained for the identifiers in the third identifier set and corporate identifiers in the first identifier set to map identifiers in the third identifier set that map to identifiers in the second identifier set.

11. The computing device of claim 1, wherein obtain a weighting value for each of a plurality of tokens in the first set of tokens and the second set of tokens based on a frequency of occurrence comprises:

combining the first set of tokens and the second set of tokens to obtain a dictionary of tokens; and determining the frequency of occurrence for each of the tokens in the dictionary of tokens, the frequency of occurrence indicating the frequency of occurrence in the first identifier set and the second identifier set.

12. A computer-implemented method comprising:

performing word tokenization on corporate identifiers in a first identifier set to obtain a first set of tokens wherein the first identifier set is based on a corporate structure file which includes one or more of a company name, a country of incorporation and an address;

performing word tokenization on identifiers in a second identifier set to obtain a second set of tokens;

obtain a weighting value for each of a plurality of tokens in the first set of tokens and the second set of tokens based on a frequency of occurrence while deemphasizing the weighting value of corporate suffix tokens indicating legal entity form;

for each corporate identifier of a plurality of corporate identifiers in the first identifier set and of a plurality of identifiers in the second identifier set, obtaining embeddings for the identifier based on embeddings of tokens obtained by performing word tokenization on that identifier and based on the weighting value for such tokens;

obtaining similarity metrics for corporate identifiers in the first identifier set and identifiers in the second identifier set based on the embeddings for such identifiers;

storing a similarity profile based on the similarity metrics for corporate identifiers in the first identifier set, the similarity profile including data mapping one or more corporate identifiers in the first identifier set to one or more identifiers in the second identifier set;

receiving a query; and generating a user interface based on a selected similarity profile identified based on the query.

13. The method of claim 12, further comprising:

prior to performing word tokenization on the corporate identifiers in the first identifier set, pre-processing the first identifier set to standardize the corporate identifiers in the first identifier set; and prior to performing word tokenization on the identifiers in the second identifier set, pre-processing the second identifier set to standardize the identifiers in the second identifier set.

14. The method of claim 13, wherein pre-processing to standardize includes one or more of:

converting characters to a particular letter case; and removing one or more characters specified in a character blacklist.

15. The method of claim 12, wherein obtaining a weighting value includes obtaining a weighting value based on an exponentially decaying weighting function.

16. The method of claim 15, wherein the exponentially decaying weighting function is configured to de-emphasize tokens having a higher frequency of occurrence.

17. The method of claim 16, wherein the exponentially decaying weighting function uses a hyperparameter to de-emphasize tokens having a higher frequency of occurrence.

18. The method of claim 17, wherein obtain a weighting value includes performing a grid search.

19. The method of claim 12 wherein obtaining embeddings for the identifier based on embeddings of tokens obtained by performing word tokenization on that identifier and based on the weighting value for such tokens includes:

generating embeddings of each token in the plurality of tokens in the first set of tokens and the second set of tokens, the embeddings being a vectorized representation of the tokens; and generating the embeddings for one of the identifiers based on the embeddings for the tokens represented by that one of the identifiers.

20. The computing device of claim 11, wherein the instructions further configure the computing device to: perform clustering, a machine learning technique, on the tokens in the dictionary of tokens.

* * * * *